A. C. BRANTINGHAM.
GYRATORY SIFTER.
APPLICATION FILED APR. 6, 1908.
12,890. Reissued Dec. 1, 1908.
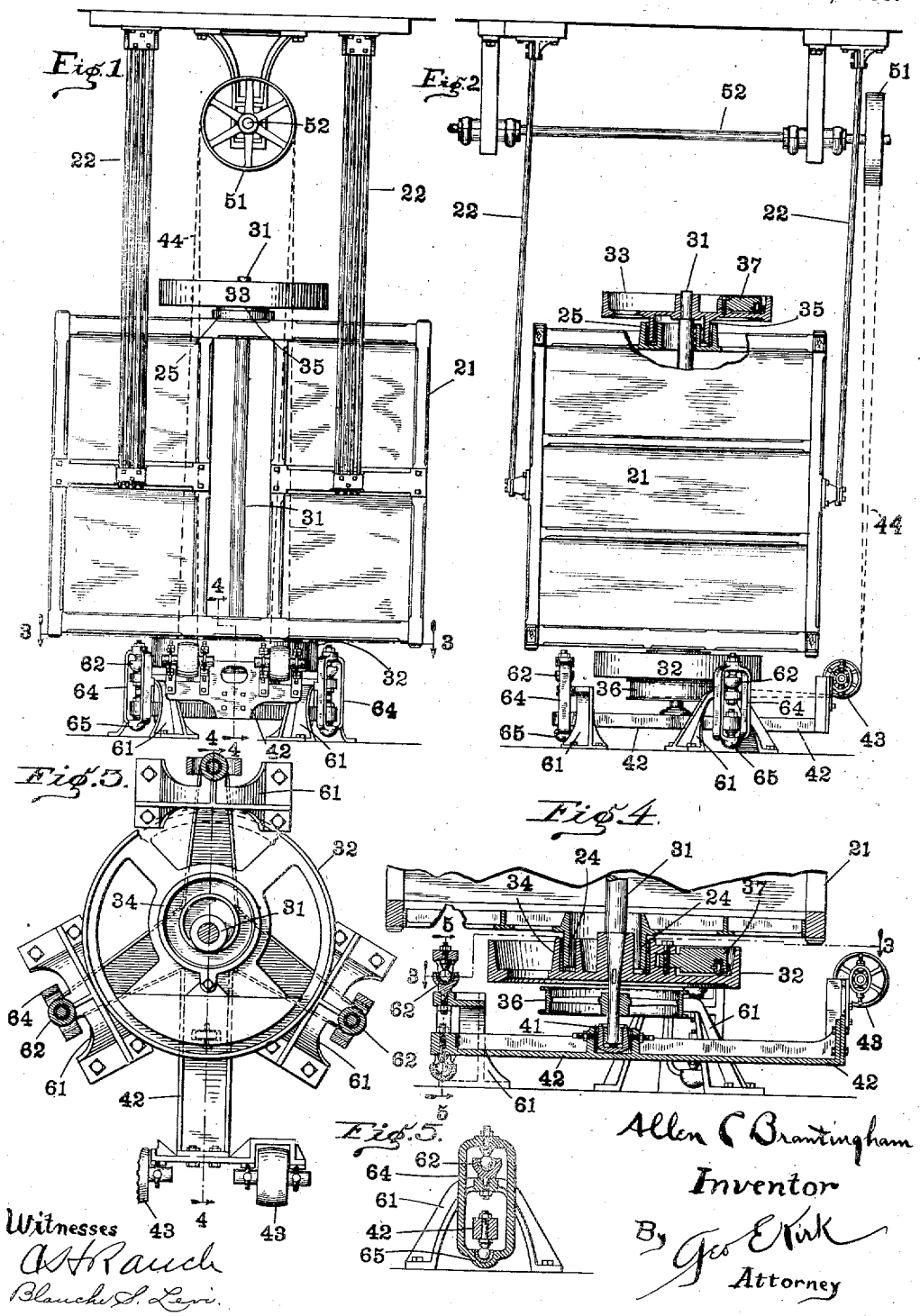

UNITED STATES PATENT OFFICE.

ALLEN C. BRANTINGHAM, OF TOLEDO, OHIO.

GYRATORY SIFTER.

No. 12,890. Specification of Reissued Letters Patent. Reissued Dec. 1, 1908.

Original No. 817,901, dated April 17, 1906, Serial No. 259,372. Application for reissue filed April 6, 1908. Serial No. 425,576.

*To all whom it may concern:*

Be it known that I, ALLEN C. BRANTINGHAM, a citizen of the United States, residing at Toledo, in the county of Lucas and State of Ohio, have invented certain new and useful Improvements in Gyratory Sifters, of which the following is a specification.

In the work of bolting or grading mill products, what are commonly known as "gyratory sifters" have proven to be the most satisfactory machines for the purpose. The best type of such machines embody a vertically-positioned centrally-arranged driving-shaft. Such machines, when their driving-shafts are mounted in bearings fixedly connected to the building, produce heavy strains upon the building structure, in operation. A construction wherein the supports for the sifter structure and also for the shaft are of a yielding character is therefore desirable. It has been discovered that such sifters can be suspended upon flexible or pivotally-connected suspending-rods, so as to have a pendulum-like movement in operation, and thus relieve the building of the lateral strains which are present when such sifters are carried by rigidly-positioned supports. The shaft in such cases may carry one or more weights at one side of its center, so that it is "unbalanced," as it is called, and thus enabled when rotated to impart the required gyratory movement to the sifter. In such sifters as heretofore constructed the shaft and the sifter have traveled together, so that both have partaken of the gyratory movement, with obvious disadvantages, the chief of which can only be overcome by a construction wherein the shaft shall have only a rotary movement and the sifter alone shall have the gyratory movement. I have therefore provided eccentric connections between the shaft and the sifter so that when the parts are properly proportioned and arranged the force of the weights will so far act oppositely to the inertia of the sifter that the latter will be driven with a gyratory movement equal to the throw of the eccentrics, while the shaft itself will remain stationary, or substantially stationary, during the ordinary operation of the machine.

In a sifter suspended in the manner in question there is a tendency to "lunge," as it is called, at the beginning of the operation when the sifter is first put in motion, or, in other words, the sifter is apt in starting to be thrown outside of its regular and proper path of movement through which it travels after having "struck its gait" or reached the regular motion which it is designed to have.

It is a further object of my invention to provide means by which this lunging shall be restrained during the initial stages of the operation, but which shall not have the effect to communicate any of the objectionable lateral strains to the building after the sifter has been put in operation and has reached its regular motion. I accomplish this object by providing, in the specific embodiment thereof herein shown, a bridge-tree carrying a step-bearing for the lower end of the shaft, said bridge-tree being independent of the sifter structure and independently mounted. The supports of said bridge-tree, like those of the sifter structure itself, are flexibly or pivotally connected, so as to avoid communicating the heavy lateral strains, consequent upon the operation, to the building; but in order to restrain the objectionable lunging during the initial stages of the operation I provide means by which the possible travel of the bridge-tree is limited.

It is of course not possible to prevent all gyratory or orbital movement of the shaft under all conditions, although such movement is substantially eliminated when the machine is doing its ordinary work. When it is underloaded or overloaded, however, the orbital movement is inclined to so increase or diminish as to fall below or exceed the throw of the eccentrics, and in such cases the shaft itself will participate to some extent in the gyratory movement of the sifter. The machine is, however, substantially self-balancing and self-regulating.

The accompanying drawings illustrate a construction embodying my invention.

Figure 1 is a side elevation of a sifter of the character in question; Fig. 2, an end elevation thereof; Fig. 3, a sectional plan view, on an enlarged scale, as seen when looking downwardly from the dotted lines 3—3 in Figs. 1 and 4; Fig. 4, a central vertical sectional view as seen when looking in the direction indicated by the arrows from the dotted lines 4—4 in Figs. 1 and 3; and Fig. 5, a detail sectional view at the point indicated at the dotted line 5—5 in Fig. 4.

The sifter structure 21 is or may be any suitable structure of the character in question and is adapted to contain a series of sieves (not shown) suitable for the purposes required. This structure is supported by suitable rods 22 from a point overhead, which rods are sufficiently flexible or yielding to permit of the proper gyratory movement of the sifter structure appropriate to the sifting operation. The gyrator comprises a shaft 31, in normal operation rotating and axially stationary but in abnormal operation orbitally movable, herein shown as provided with fly-wheels 32 and 33 at or near its lower and upper ends. Suitable eccentric flanges 34 and 35 are provided on these fly-wheels which engage with corresponding flanges 24 and 25 secured rigidly to and centrally of the sifter structure, thereby giving the shaft 31 an eccentric position relatively to the sifter structure. Weights, as 37, are secured to these fly-wheels and constitute, in the construction shown, the means which act oppositely to the inertia of the sifter structure and govern the gyratory movement of the latter. Through the comparatively large openings through the center of these flange structures 24 and 25 the shaft 31 passes, said openings being sufficient in size to permit the shaft to remain in position without interfering with the gyratory movement of the sifter.

Upon the shaft 31 at or near its lower end is a rotatable driver or pulley 36 by which the gyrator is driven. The construction might be so modified as to make the fly-wheels 32 also serve as such pulley.

The lower end of the shaft 31 is mounted in a suitable step-bearing, as 41, in a springless, yieldingly-mounted or swingable member or bridge-tree 42. The eccentric connection of the shaft 31 to the structure 21, inasmuch as shaft 31 is the connection of the structure to the bridge-tree 42, constitutes an eccentric connection between the structure 21 and the bridge-tree 42, whereby in normal gyration of the structure the bridge-tree remains idle, as this connection or shaft 31 approximates the normal center of gyration. This bridge-tree carries idler-pulleys or rotatable elements 43, and motion is imparted to the shaft 31 by a belt 44 running from the driver 36 thereon over said rotatable elements 43 to a pulley 51 on a driving shaft 52, as indicated in Figs. 1 and 2, and accordingly comprise the power transmission devices for the gyrator. As the distance between the shaft 31 and the pulleys 43 is a constant or unvarying one, notwithstanding that the structure upon which they are mounted may swing about to a certain extent, and as the distance between the pulleys 43 and the driving pulley 51 is comparatively so great as to make the change in distance between them (as the structure carrying the pulleys 43 swings) inappreciable, it will be readily seen that any swinging about of the shaft 31 when the sifter is in motion will not appreciably alter the driving capability of the belt. Such lateral swinging or movement of translation of the frame 42, in taking the driver 36 with it, brings about axial movement of the driver.

The form of supports for the bridge-tree which I prefer to bring about the axial or longitudinal actuation of the gyrator during unbalanced operation of the machine and thus restrain lunging, is illustrated in the drawings forming part of the present application. The supporting means comprises brackets 61, secured to the floor of the building, and provided with ball-and-socket bearings 62 carried on the ends of suitably-formed arms thereon, and the bridge-tree 42 is carried therefrom by means of links 64, having other ball-and-socket joints 65 as the immediate means of connection thereto. As shown in Fig. 3, three sets of these bracket-supports are preferably employed, there being also, preferably, three bearing-arms on the bridge-tree. The links, herein shown as parallel, will easily yield for a short distance in any direction, which lateral movement is resisted by gravity due to the lifting action on shaft 31. As links 64 are much shorter than rods 22, lateral movement of the structure 21 will cause comparatively slight lifting action due to rods 22, while considerable lifting action is due to an equal lateral movement affecting links 64. Accordingly the parts supported by links 64, including the gyrator, will be lifted relatively to the parts supported by rods 22 or the structure 21. This lifting, or movement into different horizontal planes, is resisted by the force of gravity, shown as the weight of the gyrator, thus bringing about the steadying of the gyrator and structure by the gyrator's own weight acting on itself through elements herein disclosed as individually rigid but collectively yielding in their action. As the distance between the ball-and-socket bearings 62 and 65 is short, the arcs described by the links soon develop a pronounced upward tendency, thus automatically introducing an increasing opposition to abnormal operation and effectually, though not rigidly making the limit of movement small. This abnormal operation when shaft 31 travels in an orbit or swings, brings about, through the medium of the links 64, the lifting or longitudinal actuation of the shaft 31 to a greater and greater extent as the distance off center increases. Therefore the links 64 permit the swing or orbital travel of shaft 31, and additionally effect the restraining through the lifting of the pendulum-like action. While, therefore, there is no rigid connection between the gyratory sieve structure and the building in a machine of this character, the supporting links will effectually restrain the lunging which is apt to occur at the time of the starting up of the machine unless means is provided to counteract it. Accordingly this disclosure embodies an efficient controlling and steadying device.

I claim as my invention—

1. The combination of a sifter structure, means whereby the same is yieldingly suspended, a shaft arranged vertically to said sifter structure and weighted more on one side than the other, eccentric connections between said shaft and said sifter structure, a bridge-tree supporting said shaft, yielding supports carrying said bridge-tree having a limited movement, idler-pulleys carried by the bridge-tree, a driving-shaft, and a belt running from a pulley on the driving shaft over the idler-pulleys on the bridge-tree to a pulley on the sifter-shaft.

2. The combination of a sifter structure, means whereby the same is yieldingly suspended, a vertical shaft weighted more on one side than on the other and having a driving connection with the sifter structure, a bridge-tree mounted independently of the sifter structure and supporting said shaft, and yielding supports for the bridge-tree having a limited movement.

3. The combination of a sifter structure, means whereby the same is yieldingly suspended, a shaft arranged vertically to said sifter-structure, eccentric connections between said shaft and said sifter structure, and independently yieldingly-supported power-transmission devices leading to said shaft.

4. The combination of a sifter structure, means whereby the same is yieldingly suspended, a bridge-tree arranged below said sifter structure, means whereby the same is yieldingly suspended, a shaft supported by said bridge-tree, eccentric connections between said shaft and said sifter structure, and power transmission devices in part carried by said bridge tree leading to said shaft.

5. The combination of a sifter structure, suspending links upon which the same is mounted, a bridge-tree, suspending-links for said bridge-tree, a shaft mounted on said bridge-tree, eccentric connections between said shaft and said sifter structure, devices mounted upon said shaft heavier upon one side than upon the other, means whereby the swing of the bridge-tree is limited, and power-transmission devices leading to the shaft.

6. The combination of a sifter structure, means whereby the same is yieldingly suspended, a shaft arranged vertically to said sifter structure, a bridge-tree supporting said shaft, supports for said bridge-tree consisting of suitable brackets secured to the building structure, and pivoted links connected to said brackets and to arms on the bridge-tree.

7. The combination with a normally gyratable machine structure and its relatively rotatable gyrator having a shaft extending through the structure, said gyrator being abnormally orbitally movable, of a gyrator supporting device relatively to which the structure may be gyrated, said device mounting the gyrator independently of the structure, and power transmission devices for actuating the gyrator.

8. The combination with a machine structure and its relatively rotatable gyrator, of an independent bridge-tree eccentrically connected to said structure, said bridge-tree supporting said gyrator, power-transmission devices also carried by said bridge-tree, and yielding supports by which said bridge-tree is carried and which supports permit said bridge-tree to have orbital movement.

9. The combination of a normally gyratable machine structure, yielding supports therefor, an independently supported laterally movable steadying device for the structure, link mechanism supporting the device, an eccentric connection between said device and said structure, and means for rotating said connection, said connection being carried by the device and effective through its weight thereon to aid in the steadying.

10. The combination of a normally gyratable machine structure, yielding supports therefor, an independent orbitally movable bridge-tree, additional yielding supports therefor, an eccentric connection between said bridge-tree and said machine structure, and power-transmission devices carried by said bridge-tree.

11. The combination with a machine structure to be normally gyrated, supporting means therefor, and a driver rotatable relatively to the structure for gyrating the structure, of a steadying device operatively coacting with the gyrator and structure to render gyration more uniform, said device including a swingable member normally stationary in mean position and yieldably movable from mean position in abnormal operation.

12. The combination of a gyratory machine structure, supporting means therefor, a gyrator mechanism rotatable relatively to the structure and operatively connected for gyrating the structure, said mechanism abnormally movable in an orbital path, and a steadying device including a member supporting the mechanism, said member abnormally laterally movable and mounted to be actuated toward normal position by the mechanism.

13. The combination with a gyratory sifter structure and supporting means therefor, of a steadying device operatively connected to the structure, said device including a laterally movable member having a bearing, a fixed member having a bearing, and intermediate means having bearings operatively engaging the bearings of the members, said means mounting the movable member and coacting to resist its lateral movement to aid in the steadying.

14. The combination of a machine structure, supporting means therefor permitting abnormal movement, a gyrator for the structure axially movable relatively thereto, and a steadying device for the structure having means connected to axially actuate the gyrator relatively to the structure as movement becomes abnormal.

15. The combination of a normally gyratable machine structure, supporting means therefor, a gyrator for the structure rotatable relatively thereto, and a steadying device for the structure relatively to which the structure may gyrate, said device including weighted means movable into different horizontal planes which movement in being opposed by gravity aids the steadying operation of the device.

16. The combination of a sifter structure, supporting means therefor, an orbitally movable gyrator for the structure, and power transmission devices comprising an axially movable rotatable driver for the gyrator, a rotatable element relatively to which the structure is movable, said element having an unvarying distance from the driver, and flexible driving means coacting with the driver and element.

17. The combination of a sifter structure, supporting means therefor, an orbitally movable or gyratable gyrator for the structure, and power transmission devices comprising a rotatable driver for the gyrator, a laterally movable rotatable element having an unvarying distance from the driver, said structure being movable relatively to the element, and flexible driving means coacting with the driver and element.

18. The combination of a sifter structure, normally gyratable, supporting means therefor, a gyrator for the structure abnormally orbitally movable, a mounting device for the gyrator independent of the sifter structure, and power transmission devices comprising a rotatable driver for the gyrator, a rotatable element having a constant distance from the driver, and flexible driving means coacting with the element and driver.

19. The combination of a sifter structure, supporting means therefor, a gyrator operatively connected to the structure and rotatable relatively thereto, and a lunge restraining device operatively connected to said gyrator including individually-rigid collectively-yielding elements coacting to steady the structure in a regular path of travel and yielding to permit orbital movement of the gyrator in abnormal operation.

20. The combination of a sifter structure, supporting means therefor, a gyrator operatively connected to the structure and rotatable relatively thereto, said gyrator having a shaft, a movable mounting independent of said structure upon which said shaft is carried embodying individually-rigid collectively-yielding elements coacting to steady the structure in a regular path of travel and yielding to permit orbital movement of the gyrator in abnormal operation.

In testimony whereof I affix my signature in the presence of two witnesses.

ALLEN C. BRANTINGHAM.

Witnesses:
C. H. RAUCH,
GEO. E. KIRK.